US 9,541,186 B2

(12) United States Patent
Kanzaki

(10) Patent No.: US 9,541,186 B2
(45) Date of Patent: Jan. 10, 2017

(54) ACTUATOR AND METHOD FOR MANUFACTURING THE SAME

(71) Applicant: DENSO CORPORATION, Kariya, Aichi (JP)

(72) Inventor: Shogo Kanzaki, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/338,630

(22) Filed: Jul. 23, 2014

(65) Prior Publication Data

US 2015/0075311 A1  Mar. 19, 2015

(30) Foreign Application Priority Data

Sep. 13, 2013  (JP) .................................. 2013-190340

(51) Int. Cl.
*F16H 57/02*  (2012.01)
*F16H 57/023*  (2012.01)
*H02K 7/116*  (2006.01)

(52) U.S. Cl.
CPC ............ *F16H 57/02* (2013.01); *F16H 57/023* (2013.01); *H02K 7/116* (2013.01); *Y10T 29/49963* (2015.01); *Y10T 74/19684* (2015.01)

(58) Field of Classification Search
CPC .......... H02K 7/10; H02K 7/081; H02K 7/116; H02K 7/1166; H02K 11/0084; H02K 11/0015; H02K 5/04; F16H 1/16; F16H 1/166; F16H 55/22; F16H 57/02; F16H 57/023; F16H 57/029; F16H 57/031; F16H 57/039; F16H 2057/02008; F16H 2057/0213; F16H 2057/0325; F16H 2061/2892; Y10T 74/19828

(Continued)

(56) References Cited

U.S. PATENT DOCUMENTS

| 4,471,251 A | 9/1984 | Yamashita |
| 5,443,292 A * | 8/1995 | Shimada ................. E05B 81/20 |
| | | 292/201 |
| 6,588,089 B2 * | 7/2003 | Babin ...................... H02K 5/00 |
| | | 15/412 |

(Continued)

FOREIGN PATENT DOCUMENTS

| JP | 2007-068378 A | 3/2007 |
| JP | 2009-159668 A | 7/2009 |
| JP | 2013-160164 A | 8/2013 |

OTHER PUBLICATIONS

Office Action issued Nov. 4, 2015 in corresponding JP Application No. 2013-190340.

*Primary Examiner* — Victor MacArthur
*Assistant Examiner* — Leonard J Archuleta

(57) ABSTRACT

A housing accommodates a motor and a deceleration mechanism. The deceleration mechanism includes a support axis extending perpendicularly to an output shaft of the motor. The housing includes a case and a cover. The case is in a bottomed tubular shape to have an accommodation chamber and a holder portion. The holder portion surrounds a bottom of the accommodation chamber and is in contact with the motor. The cover is mounted to the case to surround an opening of the case and to form a hollow portion with the holder portion to accommodate at least the motor. The motor and the deceleration mechanism are mountable into the accommodation chamber through the opening in one direction from a side of a mounting surface of the case, on which the housing is to be affixed to a support portion of an affixing member.

11 Claims, 7 Drawing Sheets

(58) Field of Classification Search
USPC .... 74/89.14, 421 A, 425, 606 R; 310/71, 83, 310/89, 239; 292/201
See application file for complete search history.

(56) References Cited

U.S. PATENT DOCUMENTS

| | | | | |
|---|---|---|---|---|
| 7,070,117 B2* | 7/2006 | Kook | ................ | B60H 1/00857 236/1 C |
| 7,111,602 B2* | 9/2006 | Sturdy | ................... | F02B 27/02 123/184.53 |
| 7,192,066 B2* | 3/2007 | Ilea | ........................ | E05B 81/25 292/201 |
| 7,337,758 B2* | 3/2008 | Sturdy | .................. | F02D 9/1065 123/184.53 |
| 2006/0181161 A1* | 8/2006 | Kawamoto | .......... | H02K 7/1166 310/51 |
| 2009/0295258 A1* | 12/2009 | Caliendo | ................ | H02K 7/116 310/68 B |
| 2012/0318081 A1* | 12/2012 | Fukuda | .................. | G01D 11/10 74/89 |
| 2016/0091052 A1* | 3/2016 | Park | ........................ | F16H 55/06 74/425 |
| 2016/0126680 A1* | 5/2016 | Maeda | .................. | H02K 5/225 310/71 |
| 2016/0165736 A1* | 6/2016 | Tsuboi | ................ | H05K 5/0017 310/71 |

* cited by examiner

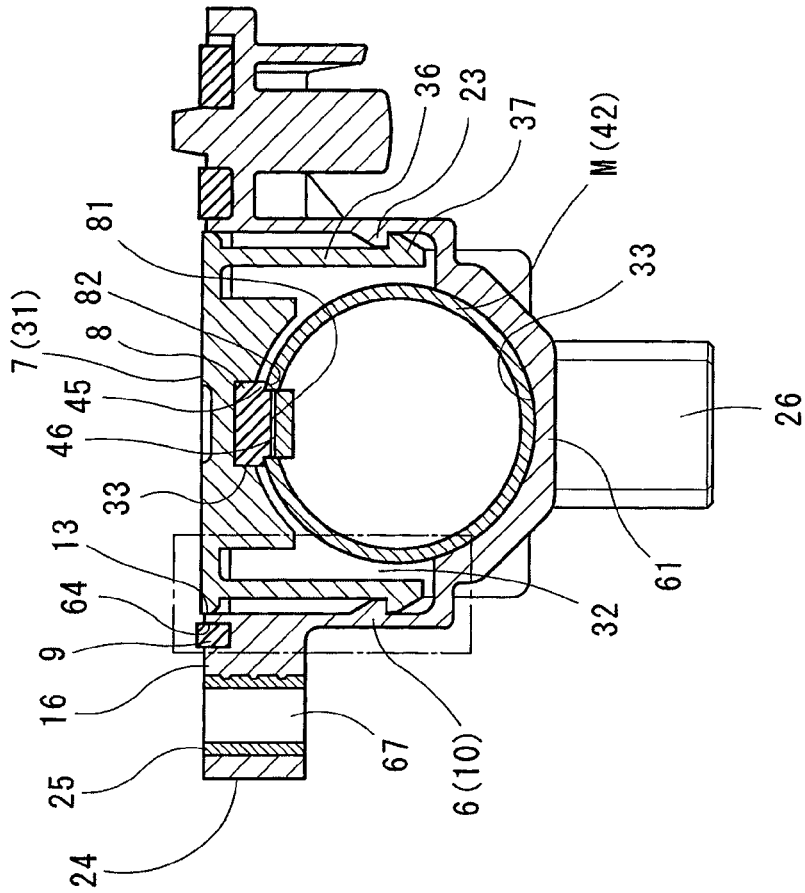
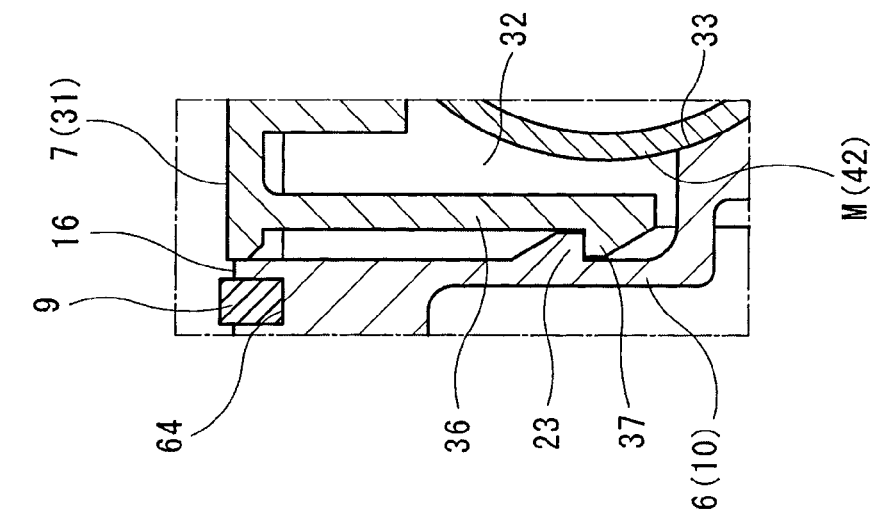

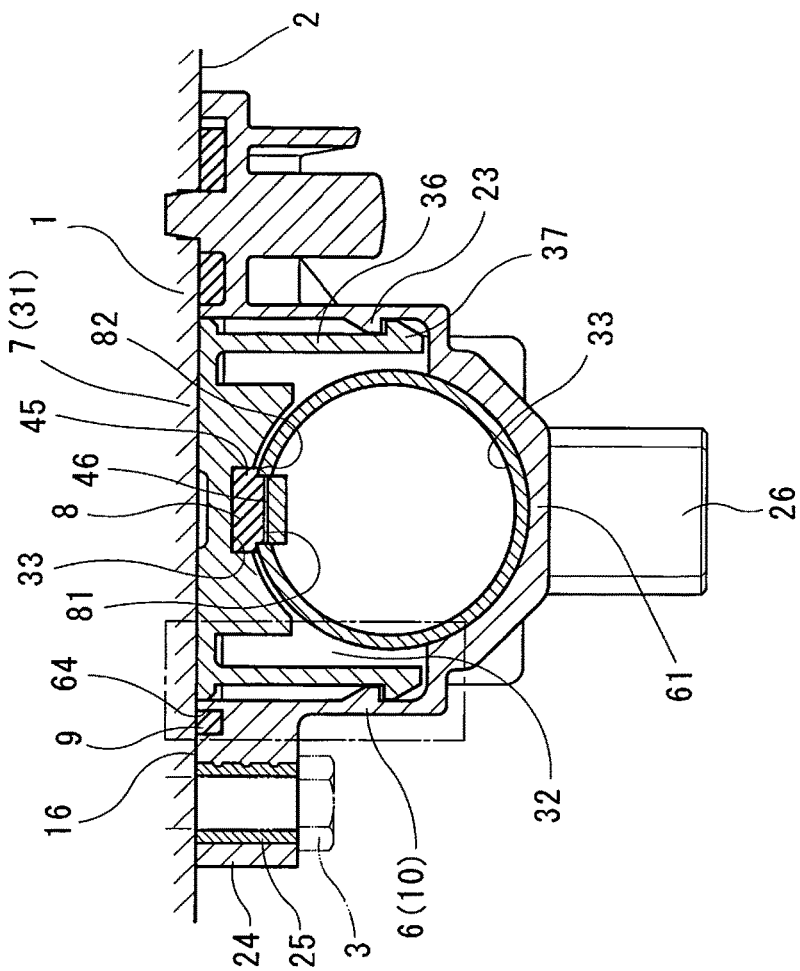
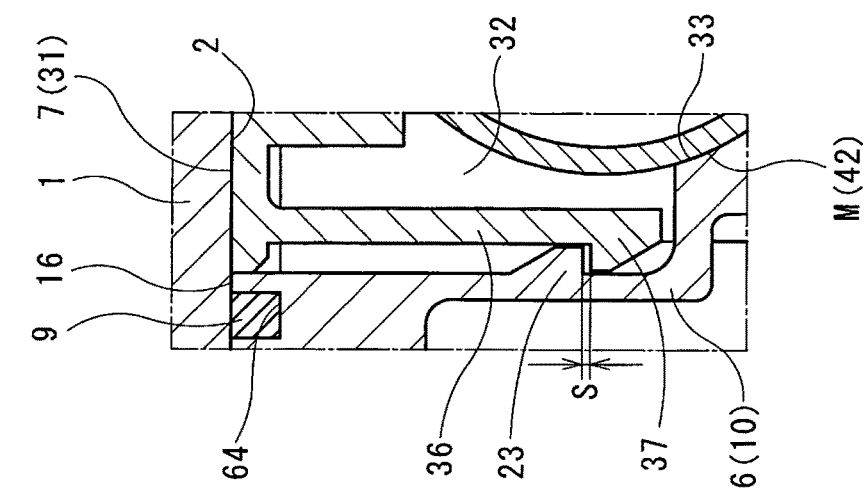

ACTUATOR AND METHOD FOR MANUFACTURING THE SAME

CROSS REFERENCE TO RELATED APPLICATION

This application is based on reference Japanese Patent Application No. 2013-190340 filed on Sep. 13, 2013, the disclosure of which is incorporated herein by reference.

TECHNICAL FIELD

The present disclosure relates to an actuator. The present disclosure may relate to, for example, an actuator including a housing to accommodate a motor and a deceleration mechanism and to be screwed and affixed to a support portion of an affixing member on the side of an internal combustion engine. The present disclosure may relate to, for example, an actuator to open and close a valve element of an intake-air-control valve, which opens and closes a passage communicated to a cylinder of an internal combustion engine, or an exhaust control valve. The present disclosure further relates to a method for manufacturing the actuator.

BACKGROUND

For example, Patent Document 1 discloses a conventional intake air system including a variable intake air control valve and an actuator. The variable intake air control valve manipulates the length or the cross-sectional area of an intake passage to control intake air supplied to a combustion chamber of each cylinder of a multi-cylinder engine, such as a 4-cylinder engine, according to an operating condition of the engine. In this way, the variable intake air control valve enhances a charging efficiency of intake air to increase an engine power. The actuator drives multiple valves, which are valve elements of the variable intake air control valve.

For example, Patent Document 2 discloses an intake air system including a tumble control valve and an actuator. The tumble control valve generates a swirl flow (tumble flow) in a vertical direction in intake air supplied to a combustion chamber of each cylinder of a multi-cylinder engine, such as a 4-cylinder engine. In this way, the tumble control valve enhances combustion efficiency in the combustion chamber thereby to reduce fuel consumption and emission such as HC. The actuator drives multiple valves, which are valve elements of the tumble control valve.

(Patent Document 1)
Publication of unexamined Japanese patent application No. 2007-068378

(Patent Document 2)
Publication of unexamined Japanese patent application No. 2013-160164

It may be desirable in an actuator to reduce a number of components and/or to reduce manufacturing cost.

SUMMARY

It is an object of the present disclosure to produce an actuator configured to enhance mountability thereof.

For example, a variable intake air control valve or a tumble control valve may include multiple valves, a valve shaft, and multiple bearings. The valves may open and close multiple intake passages formed in an intake manifold, respectively. The valve shaft may connect the valves to each other to manipulate opening positions of the valves in a whole. The bearings may support the valve shaft slidably in a rotational direction. The actuator may include a motor, a deceleration mechanism, and/or the like. The motor may generate a rotational force (torque) to drive the multiple valves. The deceleration mechanism may decelerate rotation of a motor shaft, which is an output power axis of the motor. The motor and the decelerator mechanism may be accommodated in a housing, which may be equipped to an outside of multiple cartridges in an array direction of the cartridges in an intake manifold. Each of the cartridges may be a frame-like cornered tubular object.

The motor may be a direct-current motor having a motor yoke accommodating a stator and a rotor. The rotor may include a rotor core formed of a metallic material. The deceleration mechanism may include a worm gear, a helical gear, a pinion gear, an output gear, and/or the like. The worm gear may be connected with the motor shaft of the motor and may be integrally rotatable with the motor shaft. The helical gear may be geared with the worm gear and may be rotatable. The helical gear may be coaxial with the pinion gear. The output gear may be geared with the pinion gear and may be rotatable.

The helical gear and the pinion gear may be rotatably supported by an outer circumferential periphery of a gear shaft. The gear shaft may extend in a direction perpendicular to an axial direction of the motor shaft. An impact-absorbing member, which is formed of an elastomer material, may be located between the helical gear and the pinion gear to rotate integrally with both the gears. The output gear may be connected with multiple valves via the valve shaft and may be rotatable integrally with the valves.

As described above, the actuator disclosed in Patent Documents 1 and 2 is accommodated in the housing, which is screwed to and affixed with the support portion of the intake manifold by using a bolt. The support portion may function as an affixing member on the side of the engine. The housing includes a case, a cover, a cap, and/or the like. The case includes a first sidewall portion and a first opening. The first sidewall portion is in a tubular shape to surround a motor yoke of the motor in the circumferential direction. One end in the first sidewall portion has the first opening. When the motor gear assembly is mounted to the case, one side of the motor shaft in the axial direction is inserted through the first opening. The cover is thermally crimped with the first opening via a gasket airtightly to close the cover.

The case further has a second sidewall portion and a second opening. The second sidewall portion is in a tubular shape to surround the helical gear, the pinion gear, and the impact-absorbing member in the circumferential direction. One end of the second sidewall portion has the second opening. When the gear shaft assembly is mounted to the case, one side of the gear shaft in the axial direction is inserted through the second opening. A cap is equipped airtightly to the second opening by ultrasonic welding.

The motor and the worm gear are assembled together beforehand to form a motor gear assembly in a sub-assembly state. The motor gear assembly is inserted from the first opening into the bottom of the first sidewall portion and is mounted inside the case. The helical gear, the pinion gear, the gear shaft, and the impact-absorbing member are assembled together beforehand to form a gear shaft assembly in a sub-assembly state. The gear shaft assembly is inserted from the second opening into the bottom of the second sidewall portion and is mounted inside the case.

It is noted that, the case disclosed in Patent Documents 1 and 2 has the first sidewall portion and the second sidewall portion. The motor gear assembly is mounted to the first} sidewall portion from the one side of the motor shaft in the axial direction. The gear shaft assembly is mounted to the second sidewall portion from the one side of the gear shaft in the axial direction. It is further noted that, the motor shaft and the gear shaft perpendicularly intersect with each other. That is, the motor gear assembly and the gear shaft assembly, which are components of the actuator, are mounted in two different mounting directions, respectively, possibly to result in increase in number of components and increase in manufacturing cost.

According to an aspect of the present disclosure, an actuator comprises a motor configured to generate an output power. The actuator further comprises a deceleration mechanism configured to decelerate rotation of the motor. The actuator further comprises a housing accommodating the motor and the deceleration mechanism. The housing is configured to be screwed to and affixed to a support portion of an affixing member. The deceleration mechanism includes a support axis extending in a direction, which is perpendicular to an axial direction of an output shaft of the motor. The housing includes a case and a cover. The case is in a bottomed tubular shape and has an opening, an accommodation chamber, and a holder portion. The opening opens in a radial direction of the motor and in an axial direction of the support axis, the opening being configured to open on a side of the support portion. The accommodation chamber extends from the opening toward a bottom. The holder portion surrounds the bottom of the accommodation chamber and is in contact with the motor. The cover is mounted to the case to surround the opening. The cover has a biasing portion, which forms a hollow portion with the holder portion, the hollow portion accommodates at least the motor. The motor and the deceleration mechanism are mountable to the accommodation chamber in one direction from a side of a mounting surface of the case.

BRIEF DESCRIPTION OF THE DRAWINGS

The above and other objects, features and advantages of the present invention will become more apparent from the following detailed description made with reference to the accompanying drawings. In the drawings:

FIG. 8A is a sectional view showing the electric actuator, and FIG. 8B is a sectional view showing the electric actuator when being temporarily affixed with the motor, according to the first embodiment, FIG. 8A being an enlarged view of FIG. 8B; and FIG. 9A is a sectional view showing the electric actuator, and FIG. 9B is a sectional view showing the electric actuator when being permanently affixed with the motor, according to the first embodiment, FIG. 9A being an enlarged view of FIG. 9B.

DETAILED DESCRIPTION

As follows, embodiments of the present disclosure will be described in detail with reference to drawings.

Embodiment

Configuration of First Embodiment

FIGS. 1 to 9B show an electric actuator according to a first embodiment of the present disclosure.

The actuator according to the present embodiment is an electric actuator. The actuator includes a housing. The housing is screwed and affixed to a support portion 2 of an intake manifold 1. The support portion 2 is an affixing member on the side of an internal combustion engine, which is for driving a vehicle, such as an automobile. The housing accommodates an electric motor (motor M), a deceleration mechanism, and a return spring (not shown). The electric motor (motor M) generates a rotational force to drive a tumble valve. The tumble valve is a valve element of a tumble control valve (not shown). The deceleration mechanism decelerates rotation of the motor M. The return spring generates a spring force applied to an output unit of the deceleration mechanism to bias the valve in a full-open direction or in a full-close direction.

Figure 1:
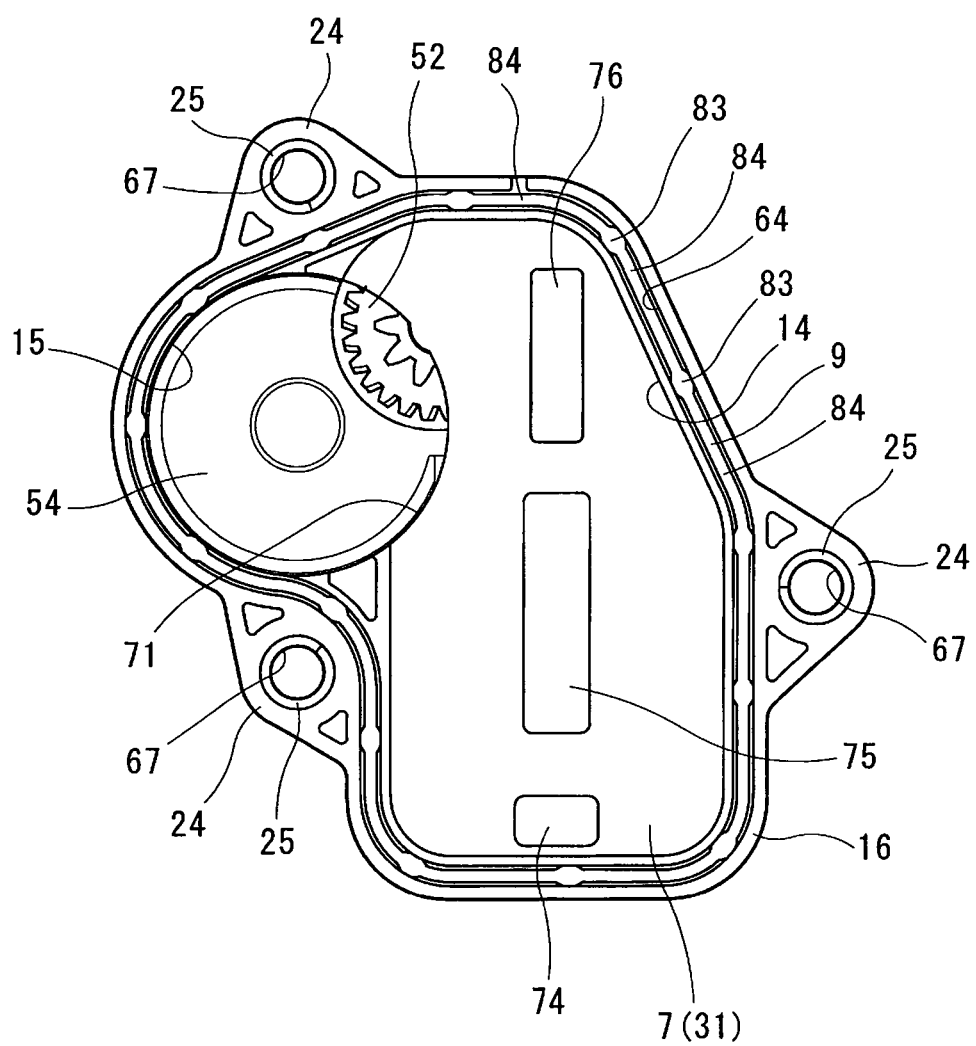
FIG. 1 is a plan view showing an electric actuator according to a first embodiment, when temporarily affixed with a motor.
Figure 2:
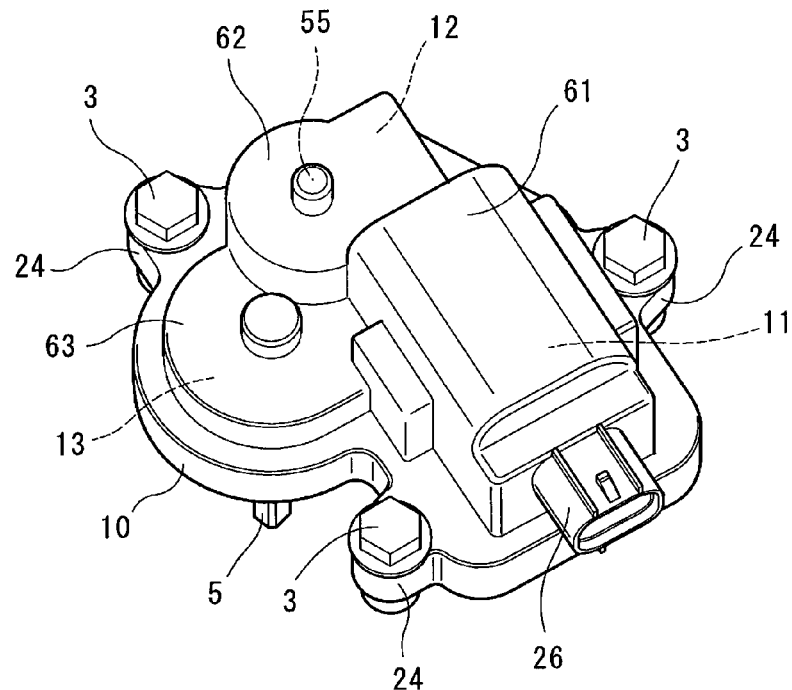
FIG. 2 is a perspective view showing the electric actuator according to the first embodiment, when temporarily affixed with the motor.
Figure 3:
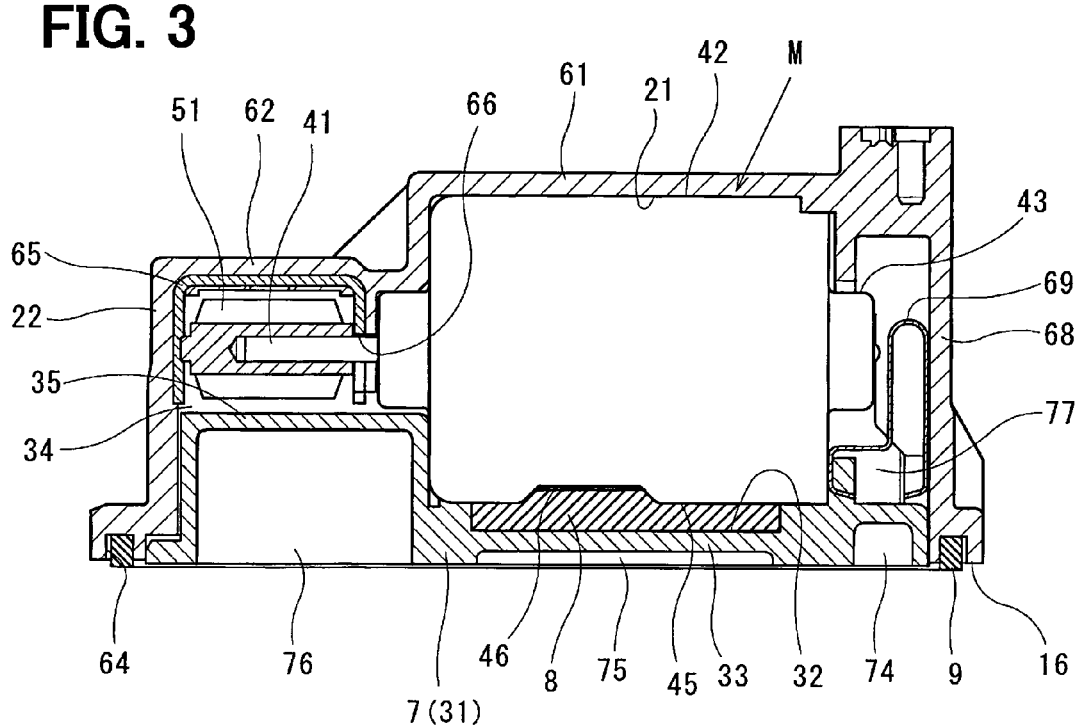
FIG. 3 is a sectional view showing the electric actuator according to the first embodiment, when temporarily affixed with the motor.
Figure 4:
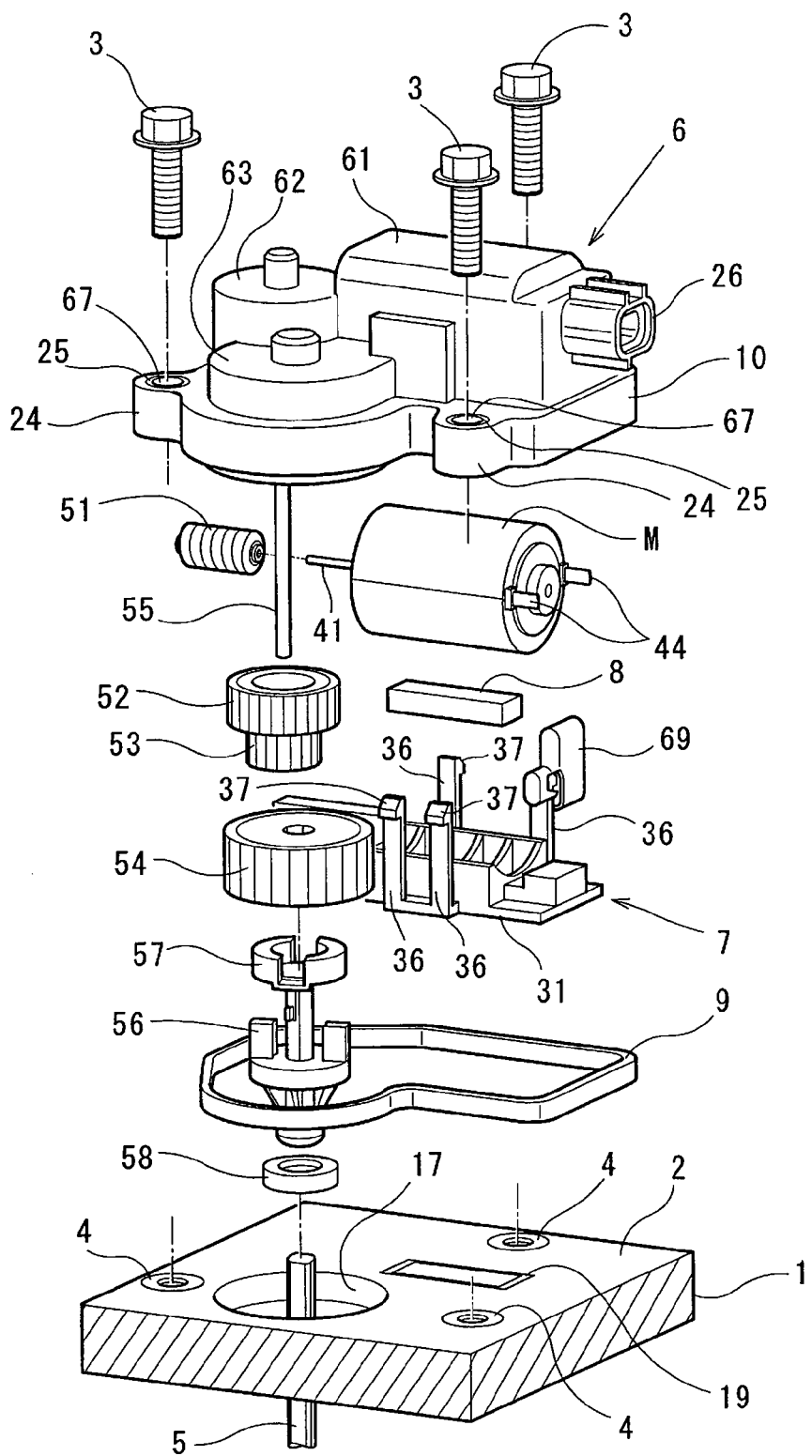
FIG. 4 is an exploded perspective view showing the electric actuator, which is according to the first embodiment, to be mounted to an intake manifold.
Figure 5A:
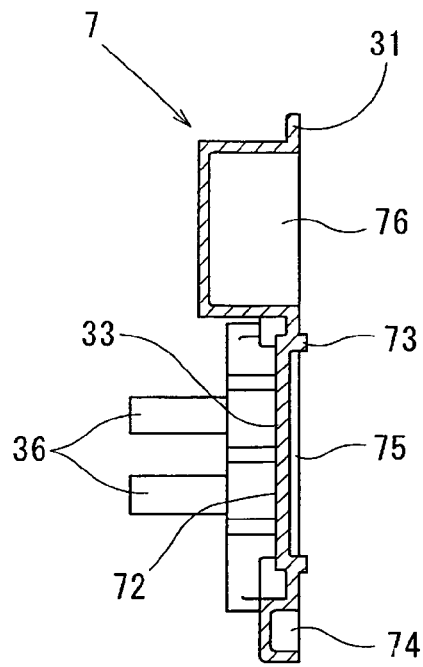
FIG. 5A is a sectional view showing a cover.
Figure 5B:
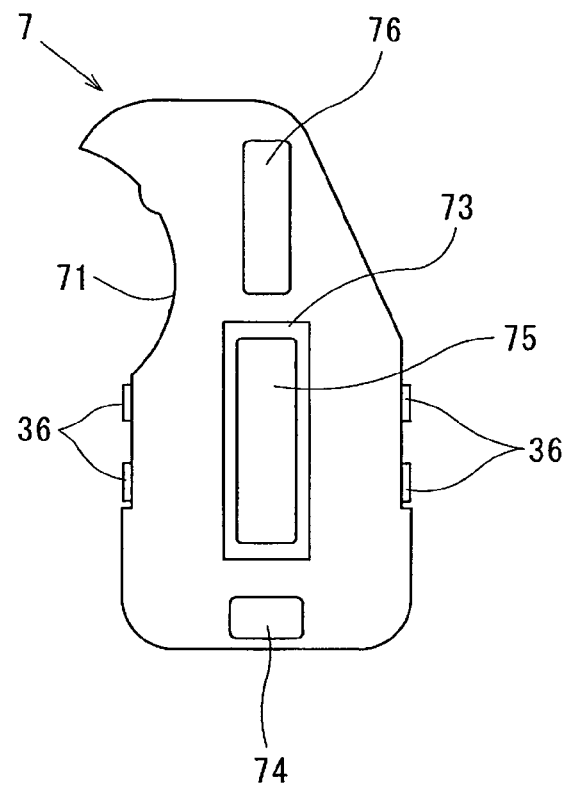
FIG. 5B is a plan view showing the cover.
Figure 5C:
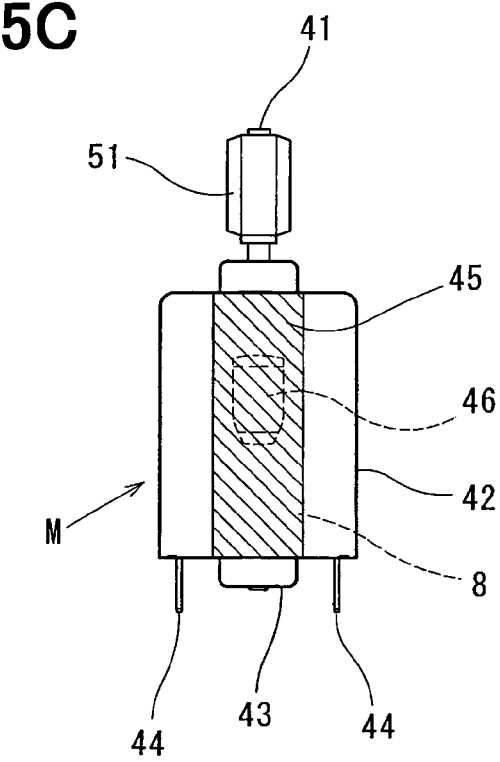
FIG. 5C is a plan view showing a contact portion of the motor with an elastic member, according to the first embodiment.
Figure 6:
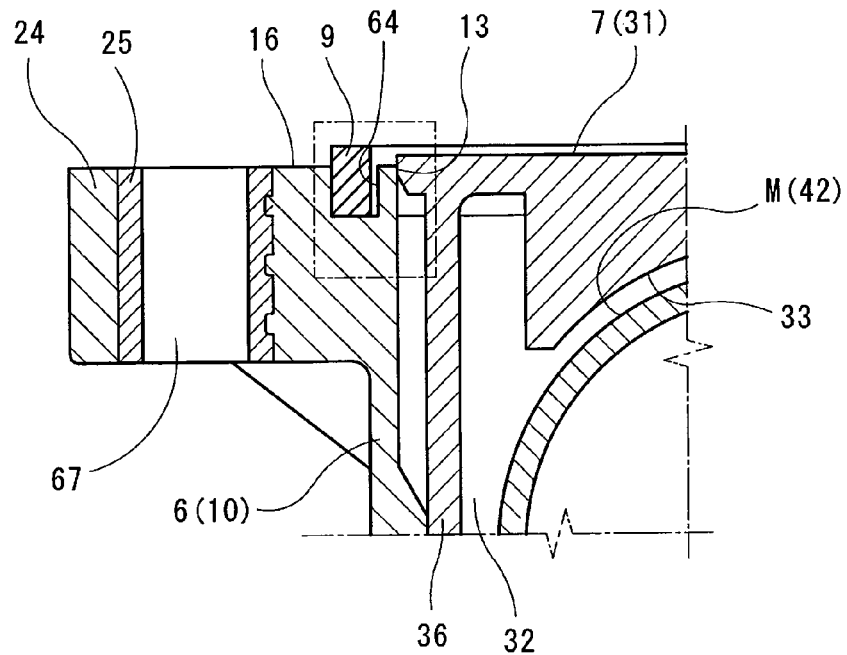
FIG. 6 is a sectional view showing a main portion of the electric actuator according to the first embodiment, when temporarily affixed with the motor.

The intake manifold 1 is formed of, for example synthetic resin. The intake manifold 1 includes a support portion (affixed portion) 2. The electric actuator is affixed to the support portion 2 by using first to third screws 3. The support portion 2 of the intake manifold 1 has a lateral surface on the side of the actuator. The lateral surface of the support portion 2 forms a joint end surface. The housing, which accommodates functional components of the electric actuator, is affixed to the joint end surface. The joint end surface of the support portion 2 is a flat surface (plane surface), which is opposed to a joint end surfaces of the housing to form a small clearance therebetween. In FIG. 4, the support portion 2 is insert-molded with first to third nuts 4.

Each of the nuts 4 has a tubular portion having an annular end surface, which is exposed at the joint end surface of the support portion 2. The tubular portions of the first to third nuts 4 have first to third screw holes (three screw holes), respectively. Screws 3 are screwed into the first to third screw holes, respectively. The three screw holes have inner circumferential peripheries defining spiral female screws, to which the three screws 3 are screwed, respectively. Each of the screw holes has a bottom end equipped with a bottom portion, which is in a circular shape. The bottom portion closes the other end side of the screw hole. The other end side of the tubular portion of each of the nuts 4 may be embedded with a resin material, which forms the intake manifold 1. In this case, both ends of the tubular portion of each of the nuts 4 may open.

Each of the screws 3 has a head portion, a collar portion, and a shaft portion. The head portion may have a hexagonal groove. The collar portion is projected radially outward from a root of the head. The shaft portion extends linearly from the root of the head portion toward the intake manifold in the axial direction. The head portion has a top surface forming a tool fitting portion having a hexagonal groove. The tool fitting portion is configured to be engaged with a tool. The collar portion has a rear surface forming a fitted end surface. The fitted end surface is fitted to a seated surface of the housing. The shaft portion is screwed into the screw hole of each of the nuts 4. The shaft portion has an outer circumferential periphery defining a spiral male screw, which is meshed with the female screw.

The tumble control valve includes a casing, multiple ducts, multiple valves, and a valve shaft 5. The casing is formed of a synthetic resin material or a metallic material. The casing connects through an upstream end of the intake manifold 1 to an outlet end of a throttle body or a surge tank. The ducts are separate components from the casing. The valves manipulate an opening area (opening ratio) of each of intake passages formed in the ducts. The valve shaft 5 is formed of a metallic material. The valve shaft 5 extends along a direction of a rotary axis of the valves. The valves are cantilever rotary valves, which are skewered with the valve shaft 5, which is a singular component. Thus, the valves are combined together and supported.

When the tumble control valve is in a full close state, upper walls of the ducts and the upper ends of the valves form clearances, respectively. The clearances function as throttles to throttle a passage sectional areas of the intake passages of the ducts. In the present state, intake air supplied to combustion chambers of the engine cylinders pass through the clearances to eccentrically flow through the upper portions of the intake passages. Consequently, the intake air generates swirl flows (tumble flows) in the vertical direction in the combustion chambers of the engine cylinders. When the tumble control valve is in a full-open state, the control valve fully opens the intake passages of the ducts. It is noted that, the valves of the tumble control valve may be set at an intermediate position to form an intermediate opening (partial opening).

The valve shaft 5 is an output shaft of the electric actuator. The valve shaft 5 is a rotation axis extending in a perpendicular direction, which is perpendicular to an intake air flow direction in the intake passages of the intake manifold 1. The valve shaft 5 extends linearly along a rotational axis direction, which is in parallel with an array direction in which the intake passages are arranged. The rotational axis direction is in parallel with an array direction in which the engine cylinders are arranged. The valve shaft 5 is a singular driving shaft, which connects the valves in a skewered state to enable the valves to move in conjunction with each other. The electric actuator is equipped with a torque transmission mechanism (coupling mechanism). The coupling mechanism is interposed between the valve shaft 5 and an output unit of the deceleration mechanism. The coupling mechanism transmits torque of the motor M from the output unit of the deceleration mechanism to the valve shaft 5.

The housing includes an actuator case (case) 6, a motor gear cover (cover) 7, an elastic member 8, and a gasket 9. The actuator case 6 is in a bottomed tubular shape to accommodate the motor M, the deceleration mechanism, the coupling mechanism, the return spring, and/or the like. The motor gear cover 7 accommodates a lock arm. The lock arm is snap fitted to a fitting portion of the case 6. The elastic member 8 is in a minus-letter shape and is located between the case 6 and the cover 7 to elastically support the motor M. The gasket 9 is an elastic sealing member in a hoop band shape. The gasket 9 airtightly seals a clearance between the support portion 2 of the intake manifold 1 and the case 6.

The case 6 is integrally formed of an electrically insulative synthetic resin. The case 6 has a recessed portion opposed to the cover 7. The recessed portion accommodates a functional component (parts) of the electric actuator. The case 6 has a sidewall portion 10, two openings 14 and 15, and an opening periphery 16. The sidewall portion 10 is in a tubular shape to surround the functional component of the electric actuator. The two openings 14 and 15 open on one end side of the sidewall portion 10. At the time of assembly, the motor M, the deceleration mechanism, the coupling mechanism and/or the like are inserted through the two openings 14 and 15 into the accommodation chambers 11 to 13. The opening periphery 16 is in a hoop band shape to surround the periphery of the openings 14 and 15. The opening 14 is a part of the opening and located on the side of the accommodation chambers 11 and 12. The opening 14 is closed with the cover 7. The opening 15 is coaxial with the opening 17. The opening 17 opens in the seated surface of the support portion 2 of the intake manifold 1.

The case 6 includes a holder portion 21, a holder portion 22, a first fitting portion 23, multiple mounting bosses 24, a collar 25, a connector 26, and the like. The holder portion 21 holds the motor M and regulates an assembly position of the motor M in the radial direction of the motor M. The holder portion 22 regulates an assembly position of the worm gear 51 in the rotational axis direction (thrust direction). The first fitting portion (fitting projection, fitting projected portion) 23 is snap-fitted with the cover 7. The mounting bosses 24 are for screwing and for affixing the housing, in particular the case 6, to the support portion 2 of the intake manifold 1. The collar 25 is formed of a metallic material and is in a tubular shape. The collar 25 is fitted in each of insertion holes of the mounting bosses 24. The connector 26 is for external connection to enable connection between the motor M and an external circuit. The opening periphery 16 of the case 6 and the end surface (plane, upper surface, or lower surface) of each of the mounting bosses 24 form a joint portion. The joint portion forms a mounting surface of the case 6. The joint portion is screwed and affixed to the joint end surface of the support portion 2 of the intake manifold 1 by using multiple screws 3.

The cover 7 is integrally formed of a synthetic resin or a metallic material. The cover 7 forms a cover portion (cover plate) 31, a biasing portion 33, and a hollow portion 34. The cover portion (cover plate) 31 covers the opening 14 of the case 6. The biasing portion 33 forms a predetermined hollow portion 32, which is configured to accommodate at least the motor M with the holder portion 21 of the case 6. The hollow portion 34 is configured to accommodate at least the worm gear of the deceleration mechanism with the holder portion 22 of the case 6. The cover 7 has a holder portion 35 to hold the motor M and to regulate an assembly position of the motor M in the rotational axis direction (thrust direction). The cover 7 is equipped with multiple arm portions (lock arms) 36. Each of the lock arms 36 is a resilient fitting nail projected from the cover plate 31. The lock arm 36 is equipped with a second fitting portion (hooking portion, fitting projection, fitting projected portion) 37 and the like. The second fitting portion 37 is fitted to the corresponding fitting projected portion 23 equipped to the case 6. Details of the case 6, the cover 7, the elastic member 8, and the gasket 9 will be described later.

Subsequently, details of the motor M will be briefly described with reference to FIGS. 1 to 9B. The motor M is accommodated and held in the accommodation chambers 11 and 12 of the case 6. The motor M is a brushed DC motor, in which an inner rotor is located in the radially inside of an outer stator, and the inner rotor is rotatable. The motor M includes an armature, a stator, a brush holder, and a pair of first and second brushes. The armature includes the motor shaft 41, which linearly extends in the rotational axis direction. The stator is in a tubular shape to surround the periphery of the armature in the circumferential direction (motor circumferential direction). The brush holder is affixed to the stator. The first and second brushes are in press-contact with the commutator of the armature to enable electric supply to an armature coil.

The stator includes a motor yoke 42 and multiple permanent magnets. The motor yoke 42 is in a bottomed tubular shape to accommodate the motor shaft 41 of the armature, such that the motor shaft 41 is rotatable. The permanent magnets (magnetic field generating magnets) are affixed to the inner circumferential periphery of the motor yoke 42. The armature is located on the radially inside of the stator to form a predetermined gap with the stator. The armature includes the motor shaft 41, an armature iron core, an armature winding, and the commutator. The motor shaft 41 is rotatably supported with a bearing support portion of the motor yoke 42 and a bearing support portion of a bearing holder 43, which is in a plate-shape, via bearings. The armature iron core (armature core) is formed by stacking multiple magnetism steel plates in the rotational axis direction of the motor shaft 41. The armature winding (an armature coil, a rotor coil) is wound around the armature core. The commutator is in press-contact with the first and second brushes.

One of the first and second brushes is the first brush. The first brush is electrically connected through an electric power supply line with a positive terminal of an external power source (battery) equipped in the vehicle, such as an automobile. The electric power supply line includes a first brush terminal 44 and a first motor terminal (not shown) of the connector 26 for external connection. The other of the first and second brushes is the second brush. The second brush is electrically connected through an electric power supply line with a negative terminal of the external power source (battery). The electric power supply line includes a second brush terminal 44 and a second motor terminal (not shown) of the connector 26 for external connection.

The motor M is a power source of the electric actuator. The motor M is electrically connected through a motor drive circuit with the external power source (battery). The motor drive circuit is electronically controlled with an engine control unit (electronic control unit, ECU). The ECU includes a microcomputer, which includes at least functions of devices, such as a CPU, a ROM, and a RAM. The ECU is configured to execute a control program, which is stored in memory devices of the microcomputer such as the ROM, thereby to control electricity supply to the motor M of the tumble control valve, when an ignition switch device is turned ON (IG-ON, activated). The ECU is configured to cause the microcomputer to receive A/D-converted sensor signals from various sensors. The sensor signals are A/D-converted with an A/D conversion circuit. The various sensors may include an airflow meter, a crank angle sensor, an accelerator position sensor, a throttle position sensor, an intake-air temperature sensor, a cooling-water temperature sensor, an exhaust gas sensor, an air/fuel ratio sensor, an oxygen concentration sensor, and or the like.

Subsequently, details of the deceleration mechanism will be briefly described with reference to FIGS. 1 to 9B. The deceleration mechanism includes a worm gear 51, a helical gear 52, a spur gear 53, an output gear 54, and the like. The worm gear 51 is in a tubular shape and is affixed to the outer circumferential periphery of the motor shaft 41 of the motor M. The helical gear 52 is in a tubular shape and is meshed with the worm gear 51 to be rotated by the worm gear 51. The spur gear 53 is directly connected with the helical gear 52. The spur gear 53 may be a pinion gear. The output gear 54 is in a tubular shape and is meshed with the spur gear 53 to be rotated by the spur gear 53. The spur gear 53 is smaller than the helical gear 52 in outer diameter. The spur gear 53 is directly connected with an end surface of the helical gear 52. The spur gear 53 may be formed of resin integrally with the helical gear 52.

The helical gear 52 and the spur gear 53 are rotatably supported by an outer circumferential periphery of the gear shaft 55. The gear shaft 55 functions as a support axis of the deceleration mechanism. The gear shaft 55 is located between a first opposed portion of the case 6 and a second opposed portion of the case 6. The gear shaft 55 extends in a perpendicular direction, which is perpendicular to the axial direction (rotational axis direction) of the motor shaft 41. The gear shaft 55 is press-fitted to a first fitting recessed portion (not shown) at one end in the axial direction. The first fitting recessed portion is formed in a first joint portion of the case 6. The first joint portion is the first opposed portion, which is the bottom portion of the case 6. The gear shaft 55 is fitted to a second fitting recessed portion (not shown) at the other end in the axial direction. The second fitting recessed portion is formed in a second joint portion of the cover 7. The second joint portion is the second opposed portion, which is the cover plate 31 of the cover 7.

Subsequently, details of the coupling mechanism will be briefly described with reference to FIGS. 1 to 9B. The coupling mechanism forms a torque transmission mechanism between the valve shaft 5 and the output gears 54 of the deceleration mechanism. The torque transmission mechanism transmits a torque of the motor M from the output gear 54 of the deceleration mechanism to the valve shaft 5. The coupling mechanism includes first and second rotor members, a rubber cushion 57, and the like. The first and second rotor members may correspond to the output gear 54 and a coupling 56, respectively. The output gear 54 and the coupling 56 are located on the same rotation axis and are rotatable relative to each other. The rubber cushion 57 is held between the output gear 54 and the coupling 56.

The coupling 56 is rotatably supported by a bearing support portion via the bearing 58. The bearing support portion (bearing holder) is equipped in vicinity of an opening 17 of the intake manifold 1. The coupling 56 includes a tubular portion, which is press-fitted to one end of the valve shaft 5 in the axial direction. The tubular portion of the coupling 56 has a fitting hole, which is in a polygonal shape. The fitting hole is fitted to a fitting portion of the valve shaft 5, which is in a polygonal shape. The rubber cushion 57 is an impact-absorbing member (elastomer object), which is formed of, for example, synthetic rubber. The rubber cushion 57 absorbs an impact torque (load torque), which is transmitted to the output gear 54 or the coupling 56.

Feature of First Embodiment

Subsequently, details of the case 6 will be briefly described with reference to FIGS. 1 to 9B. As described above, the case 6 includes the sidewall portion 10, the accommodation chambers 11 to 13, the openings 14 and 15, the holder portions 21 and 22, the fitting projected portion 23, the mounting boss 24, and the like. The three accommodation chambers 11 to 13 are formed in the case 6. The three accommodation chambers 11 to 13 include two accommodation chambers 11 and 12, which are recessed grooves extending from the opening 14 to the bottom side. The remaining accommodation chamber 13 is a recessed groove extending from the opening 15 to the bottom side. The three accommodation chambers 11 to 13 extend along the axial direction, which is perpendicular to the mounting surface of the case 6. The axial direction is in parallel with the diametrical direction of the motor M and is in parallel with the diametrical direction of the gear shaft 55. The motor M and a part of the deceleration mechanism are inserted toward the bottom side through the openings 14 and 15 into the interior of the three accommodation chambers 11 to 13. The inserted part of the deceleration mechanism includes the worm gear 51, the helical gear 52, the spur gear 53, the output gear 54, the gear shaft 55, the coupling 56, the rubber cushion 57, and the like.

One of the two accommodation chambers 11 and 12 is the accommodation chamber 11, which is a first recessed portion. The accommodation chamber 11 is surrounded by the cover 7, the sidewall portion 10, and the holder portion 21. The accommodation chamber 11 accommodates the motor M and the elastic member 8. The other of the two accommodation chambers 11 and 12 is the accommodation chamber 12, which is a second recessed portion. The accommodation chamber 12 is surrounded by the cover 7, the sidewall portion 10, and the holder portion 22. The accommodation chamber 12 accommodates a tip end side of the motor shaft 41 and a part of the deceleration mechanism. The accommodated deceleration mechanism is the worm gear 51, the helical gear 52, the spur gear 53, the gear shaft 55, and the like. The remaining one is the accommodation chamber 13, which is a third recessed portion. The accommodation chamber 13 accommodates a remainder of the deceleration mechanism and the coupling mechanism, which are mounted to the valve shaft 5, in advance, before the electric actuator is mounted to the support portion 2 of the intake manifold 1. The remainder of the deceleration mechanism includes the output gear 54. The coupling mechanism includes the coupling 56 and rubber cushion 57. The three accommodation chambers 11 to 13 are equipped with, at the bottom side, bottom portions 61 to 63. The bottom portions 61 to 63 are located on the opposite side of the accommodation chambers 11 to 13 from the opening side to close the accommodation chambers 11 to 13. The openings 14 and 15 are actuator insertion holes. The openings 14 and 15 open on the mounting seat side of the intake manifold 1 on the side of the engine.

The openings 14 and 15 open on the one side of the motor M in the diametrical direction and on the one side of the gear shaft 55 in the diametrical direction. The opening periphery 16 is equipped around the openings 14 and 15. The opening periphery 16 is located on the same plane as the openings 14 and 15. The opening periphery 16 is in a hoop band shape circumferentially to surround the openings 14 and 15. The opening periphery 16 has a flat mounting surface. The opening periphery 16 is opposed to the mounting surfaces of the support portion 2 of the intake manifold 1 to form a predetermined small clearance therebetween. The opening periphery 16 has a mounting groove 64 opening on the mounting surface. The mounting groove 64 is in a hoop band shape to extend from the opening side toward the bottom side. The mounting groove 64 is equipped with the gasket 9. The mounting groove 64 has groove lateral sides and a groove bottom surface. The groove lateral surfaces are elastically in contact with both lateral surfaces of the gasket 9 in the width direction. The groove bottom surface is elastically in contact with a bottom surface of the gasket 9 in the thickness direction.

The holder portion 21 is a part of the bottom portion 61 of the accommodation chamber 11. The holder portion 21 closes a part of the accommodation chamber 11 on the opposite side of the opening side. That is, the holder portion 21 closes a part of the bottom side of the accommodation chamber 11. The upper surface of the holder portion 21 forms a bottom surface (contact surface), which is in a recessed curved shape. The upper surface of the holder portion 21 is in contact with a protruded curved surface and a flat surface of the motor yoke 42 of the motor M. The holder portion 21 is in an arc shape to surround partially the motor yoke 42 of the motor M. The holder portion 22 is a part of the bottom portion 62 of the accommodation chamber 12. The holder portion 21 closes a part of the accommodation chamber 12 on the opposite side of the opening side. That is, the holder portion 21 closes a part of the bottom side of the accommodation chamber 12. The holder portion 22 is insert-molded with a thrust receptacle plate 65. The thrust receptacle plate 65 receives a thrust load from the motor shaft 41 of the motor M and the worm gear 51. The thrust receptacle plate 65 has a slit 66. At the time of assembly, the motor shaft 41 is enabled to be inserted into the slit 66.

The fitting projected portion 23 is projected from the inner surface of a sidewall portion 20 of the case 6 into the center of the accommodation chambers 11 and 12 toward the motor M. The fitting projected portions 37 are formed on the tip end of the lock arms 36 of the cover 7. Each of the fitting projected portions 37 is snap-fitted to the fitting projected portion 23, when the cover 7 is mounted to the case 6 in the state where the elastic member 8 is interposed between the motor M and the cover 7. The mounting bosses 24 are equipped to the case 6. The case 6 is affixed to the support portion 2 of the intake manifold 1 by screwing the screws 3 into the mounting bosses 24. The mounting bosses 24 are extended outward from the outer periphery (lateral side) of the opening periphery 16 of the case 6.

The mounting bosses 24 form an affixed portion (attachment portion), which is affixed to the support portion 2 of the intake manifold 1 with the screws 3. The mounting bosses 24 have first to third through holes (three through holes) into which the shaft portions of the screws 3 penetrate in the axial direction (screwed direction of housing). Metallic collars 25 are fitted in the insertion holes, respectively, for reinforcement. The metallic collars 25 have first to third insertion holes (three insertion holes) 67 into which the shaft portions of the screws 3 penetrate in the axial direction (screwed direction of housing).

Each of the mounting bosses 24 has an upper end surface defining an annular seated surface around the through hole. The head portion and the flange of the screw 3 are in contact with the seated surface of the mounting boss 24. With the present configuration, the head portion and the flange of each of the screws 3 are retained by the seated surface of the mounting boss 24. The mounting bosses 24 have lower end surfaces defining mounting surfaces each mounted to the support portion 2 of the intake manifold 1. The mounting surface of the mounting boss 24 is a flat surface opposed to the mounting surface of the support portion 2 of the intake manifold 1 to form a small clearance between the mounting surface of the mounting boss 24 and the mounting surface of the support portion 2.

Subsequently, details of the cover 7 will be briefly described with reference to FIGS. 1 to 9B. As described above, the cover 7 includes the cover plate 31, the hollow portions 32 and 34, the biasing portion 33, the holder portion 35, the lock arms 36, the fitting projected portions 37, and the like. The cover plate 31 is mounted to the case 6 to cover the opening 14 of the case 6. The cover plate 31 includes the biasing portion 33, which forms the predetermined hollow portion 32 with the holder portions 21 of the case 6 to enable accommodation of the motor M. When mounted to the case 6 to cover the opening 14, the biasing portion 33 is in surface contact with the flat surface of the motor yoke 42 of the motor M on the one side in the diametrical direction via the elastic member 8, thereby to bias the motor M toward the holder portion 21 of the case 6. The flat surface of the motor yoke 42 may function as a contact portion 45 and 46 of the motor yoke 42. The contact portions 45 and 46 of the motor yoke 42 are in rectangular shapes. The contact portion 46 is dented toward the bottom side beyond the contact portion 45. That is, the contact portion 46 is dented toward the rotation axis of the motor M. The contact portion 46 forms a fitting groove fitted with a part of the elastic member 8.

The cover plate 31 includes the holder portion 35, which is in a U-shape. The holder portion 35 is mounted to the case 6 to cover the opening 14 of the case 6. The holder portion 35 forms a predetermined hollow portion 34 with the holder portion 22 of the case 6 to accommodate a part of the deceleration mechanism. The holder portion 35 has a lateral surface, which is in surface contact with a lateral surface of the motor M on one side in the rotational axis direction, when the holder portion 35 is mounted to the case 6 to cover the opening 14. Thus, the lateral surface of the holder portion 35 regulates the thrust position of the motor M. The case 6 has an opposed portion 68, which is opposed to the lateral surface of the holder portion 35, when the holder portion 35 is mounted to the case 6 to close the opening 14. A spring 69 is equipped to the opposed portion 68. The spring 69 is in surface contact or in line contact with the lateral surface of the motor M on the other side in the rotational axis direction. In this way, the spring 69 biases the motor M toward the holder portion 35 of the cover 7 The spring 69 is a thin-plate shaped vibration proof spring (blade spring) to restrain oscillation of the motor M.

The cover 7 includes the arm portions 36, the fitting projected portions 37, and the like. The arm portions (lock arms) 36 extend from the cover plate 31 toward the fitting projected portions 23 of the case 6. The fitting projected portions 37 are equipped to the tip ends of the lock arms 36, respectively. The fitting projected portions 37 are snap-fitted to the fitting projected portions 23 of the case 6. The cover plate 31 of the cover 7 has a notch 71, which is in an arc shape corresponding to an outline of the output gear 54 of the deceleration mechanism, such that the cover plate 31 does not cover the opening 15. The cover plate 31 has a rear surface (inner surface), which defines the biasing portion 33. The biasing portion 33 has an accommodation groove 72, which is in a rectangular shape. The accommodation groove 72 detachably holds the elastic member 8.

The cover plate 31 has an outer surface, which defines a flat opposed end surface. The opposed end surface is opposed to the mounting surfaces of the support portion 2 of the intake manifold 1 to form a predetermined small clearance therebetween. The opposed end surface of the cover plate 31 has an annular elongated projected portion (annular elongated projected rib) 73, which is projected toward the mounting surface of the support portion 2 of the intake manifold 1. The elongated projected rib 73 has a tip end surface (top surface) forming a sealing portion. The sealing portion is tightly in contact with the mounting surface (contact portion 19) of the support portion 2 of the intake manifold 1 to seal the small clearance between the mounting surface of the support portion 2 of the intake manifold 1 and the opposed end surface of the cover plate 31 of the cover 7. It is noted that, in a case where the gasket 9 enables airtight sealing sufficiently, the contact portion 19 of the support portion 2 and the elongated projected rib 73 may be omitted. The surface (outer surface) of the cover plate 31 defines recessed grooves 74 to 76, which are each in a rectangular shape. The recessed grooves 74 to 76 are formed at positions, which correspond to the biasing portion 33, the holder portion 35, and a retaining portion 77. The retaining portion 77 retains both ends of the spring 69. The elongated projected rib 73 is equipped around the periphery of the opening of the recessed groove 75.

Subsequently, details of the elastic member 8 will be briefly described with reference to FIGS. 1 to 9B. The elastic member 8 is formed in rectangular parallelepiped shape. The elastic member 8 is located in the hollow portion 32 together with the motor M. Specifically, the elastic member 8 is interposed between the groove bottom surface of the accommodation groove 72 of the biasing portion 33 of the cover 7 and the contact portions 45 and 46 of the motor yoke 42 of the motor M. The elastic member 8 elastically supports the motor M with the holder portion 21 of the case 6. The elastic member 8 is elastically deformable at least in a direction in which the case 6 is screwed to the support portion 2 of the intake manifold 1. The elastic member 8 is in surface contact with or is in line contact with the contact portions 45 and 46 of the motor yoke 42 of the motor M along the rotational axis direction (thrust direction, longitudinal direction) of the motor M. The elastic member 8 has a biasing portion 81 and a biasing portion 82. The biasing portion (fitting portion) 81 is elastically in contact with the contact portion 45 of the motor yoke 42 of the motor M. The biasing portion (fitting portion) 82 is elastically in contact with the contact portion 46 of the motor yoke 42 of the motor M.

The elastic member 8 is integrally formed of an elastomer material. The elastomer material of the elastic member 8 may be optional from various elastic materials. The elastomer material of the elastic member 8 may be, for example, synthetic rubber, such as hydrogen blended nitrile rubber (H-NBR), silicone rubber, fluorocarbon rubber (FPM), and/or the like. The elastomer material of the elastic member 8 may be, for example, elastomer, such as thermoplastic elastomer formed by blending polypropylene (PP) with ethylene propylene rubber (EPDM), and/or the like. The elastomer material may be formed by blending two or more kinds of synthetic rubber and natural rubber. The outline and the sectional shape of the elastic member 8 may be arbitrarily modified according to the outline of the motor yoke 42 of the motor M.

Subsequently, details of the gasket 9 will be briefly described with reference to FIGS. 1 to 9B. The gasket 9 forms an airtight sealing portion. Specifically, the gasket 9 is mounted into the mounting groove 64 of the opening periphery 16 of the case 6. The gasket 9 is tightly in contact with the mounting surface of the support portion 2 of the intake manifold 1. Thus, the gasket 9 airtightly seal the small clearance between the mounting surface of the support portion 2 of the intake manifold 1 and the opposed end surface of the cover plate 31 of the cover 7. The gasket 9 has an upper surface (roof surface) on the upper side. The upper surface of the gasket 9 is on one side in the thickness direction, in which the housing is screwed. The upper surface of the gasket 9 is elastically in contact with the support portion 2 of the intake manifold 1. The gasket 9 has a bottom surface (lower surface). The bottom surface of the gasket 9 is on the other side in the thickness direction. The bottom surface of the gasket 9 is elastically in contact with the groove bottom surface of the mounting groove 64.

The gasket 9 has broad portions 83 and narrow portions 84, which are alternately arranged at predetermined intervals along the longitudinal direction (circumference direction). The broad portion 83 has both lateral surfaces on both sides in the width direction. Both the lateral surfaces are elastically in contact with the groove lateral surfaces of the mounting groove 64. The gasket 9 is integrally formed of an elastomer material. The elastomer material of the gasket 9 may be similar to an elastomer material of the elastic member 8. The elastomer material may be formed by blending two or more kinds of synthetic rubber, natural rubber, and/or the like. The elastomer material of the gasket 9 may be the same as the elastomer material of the elastic member 8 and may be different from the elastomer material of the elastic member 8. The band shape, the outline, and the sectional shape of the gasket 9 may be arbitrarily modified correspondingly to the shape of the mounting groove 64 of the case 6.

Figure 7:
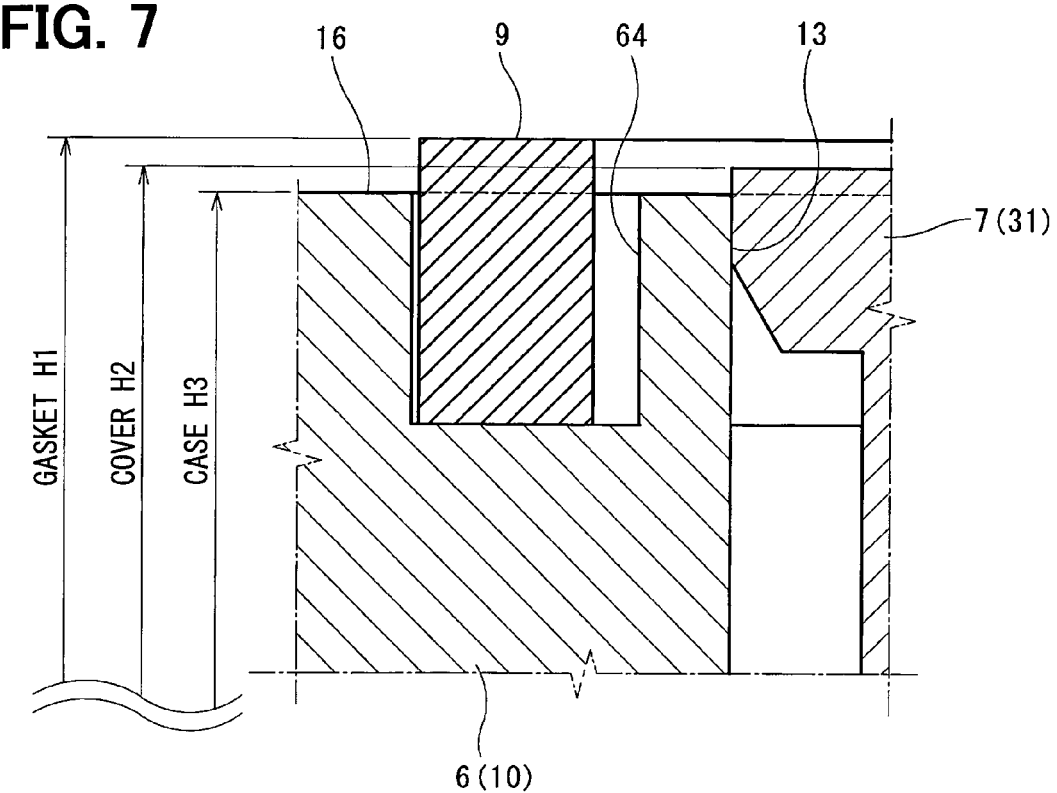
FIG. 7 is an explanatory view showing a projection height H1 of a gasket, a projection height H2 of a cover, and a projection height H3 of a case, when the motor is temporary affixed, according to the first embodiment.

As shown in FIG. 7, the roof surface of the gasket 9 has a projection height H1 relative to the outside before the housing (case 6) of the electric actuator is mounted to the support portion 2 of the intake manifold 1 by using the screws 3.

The surface of the cover plate 31 of the cover 7 has a projection height H2 relative to the outside before the housing (case 6) of the electric actuator is mounted to the support portion 2 of the intake manifold 1 by using the screws 3.

The opposed end surface of the opening periphery 16 of the case 6 has a projection height H3 relative to the outside before the housing (case 6) of the electric actuator is mounted to the support portion 2 of the intake manifold 1 by using the screws 3.

The projection height H1, the projection height H2, and the projection height H3 satisfy the following Equation 1.

$$H1 > H2 > H3 \quad \text{(Equation 1)}$$

The motor M is a power source of the electric actuator. Together with the deceleration mechanism and the coupling mechanism, the motor M is inserted through the opening 14 of the case 6 toward the bottom of the accommodation chamber 11. The motor M is inserted into the accommodation chamber 11 along the diametrical direction of the motor M and along the diametrical direction of the gear shaft 55. Thus, the motor M is accommodated in the accommodation chamber 11 such that the motor M is in contact with the holder portion 21. The motor M is accommodated, such that the motor M is submerged in the accommodation chamber 11 of the case 6 entirely in the diametrical direction. The motor M is accommodated and submerged in the accommodation chamber 11 of the case 6 to leave a predetermined volume on the side of the opening of the case 6. The predetermined volume (space) is sufficient to accommodate at least the elastic member 8 and the biasing portion 33 of the cover 7. The motor M is accommodated in the hollow portion 32 formed between the holder portion 21 of the case 6 and the biasing portion 33 of the cover 7.

The housing of the electric actuator according to the present embodiment includes the case 6. The motor M and the worm gear 51 are beforehand assembled together to form a sub-assembly (motor gear assembly). The motor gear assembly in a sub-assembly state is mounted in the accommodation chambers 11 and 12 and affixed to the case 6. The helical gear 52, the spur gear 53, and the gear shaft 55 are beforehand assembled together to form a sub-assembly (gear shaft assembly). The gear shaft assembly in a sub-assembly state is mounted in the accommodation chamber 12 and affixed to the case 6. Sealing of the case 6 with the support portion 2 of the intake manifold 1 and sealing of the cover 7 with the case 6 are made only with the gasket 9 on the side of the mounting surface of the case 6. In this way, the sealing portion is formed at one location.

The housing includes the cover 7. The cover 7 is mounted to the case 6 to close the opening 14 of the case 6, in a state where the elastic member 8 is mounted between the contact portions 45 and 46 of the motor yoke 42 of the motor M and the groove bottom surface of the accommodation groove 72 of the biasing portion 33 of the cover 7. The cover 7 is mounted to the case 6 before the housing is affixed to the support portion 2 of the intake manifold 1. A mounting direction of the motor M to the accommodation chamber 11 of the case 6 is substantially the same as a mounting direction of the gear shaft 55 to the accommodation chamber 12 of the case 6. In addition, the mounting direction of the motor M to the accommodation chamber 11 of the case 6 is substantially the same as a screwing direction of the housing (case 6) to the support portion 2 of the intake manifold 1. That is, mounting operation of the motor M and the deceleration mechanism into the accommodation chambers 11 and 12 of the case 6 is implemented in the one direction from the side of the mounting surface of the case 6. The deceleration mechanism includes the worm gear 51, the helical gear 52, the spur gear 53, the gear shaft 55 and the like.

Manufacturing Method of First Embodiment

Subsequently, a mounting method of the electric actuator to the support portion 2 of the intake manifold 1 according to the present embodiment will be briefly described with reference to FIGS. 1 to 9B. First, a manufacturing process of the electric actuator to the accommodation chambers 11 to 13 of the case 6, before the case 6 is mounted to the support portion 2 of the intake manifold 1, will be briefly described with reference to FIGS. 7, 8A and 8B.

First, the motor M and the worm gear 51 are assembled together beforehand to form the sub-assembly (motor gear assembly). The motor gear assembly in the sub-assembly state is mounted into the accommodation chambers 11 and 12. In the present state, the motor M is inserted in the diametrical direction of the motor M from the side of the opening 14 of the case 6 toward the bottom side of the accommodation chamber 11. Thus, the motor M is accommodated in the accommodation chamber 11, such that the motor M is in contact with the holder portion 21 of the case 6. In addition, the thrust receptacle plate 65 is insert-molded with the holder portion 22 of the case 6 to have the slit 66. The motor shaft 41 is inserted through the slit 66. In this way, the worm gear 51 is positioned and held in the accommodation chamber 12. At this time, the motor gear assembly is interposed between the thrust receptacle plate 65 and the spring 69. In the present state, the motor gear assembly is accommodated in the accommodation chambers 11 and 12. Therefore, the motor gear assembly is positioned and held relative to the rotational axis direction (thrust direction) of the motor shaft 41.

In addition, the helical gear 52, the spur gear 53, and the gear shaft 55 are assembled together beforehand to form the sub-assembly (gear shaft assembly). The gear shaft assembly in the sub-assembly state is mounted into the accommodation chambers 12 and 13. In the present state, the gear shaft assembly is inserted in the diametrical direction of the gear shaft 55 from the side of the opening 14 of the case 6 toward the bottom side of the accommodation chamber 12. Thus, the gear shaft assembly is accommodated in the accommodation chamber 12 in the state where the worm gear 51 and the helical gear 52 are meshed together. The motor M and a part of the deceleration mechanism are mounted to the case 6 in the above-described manufacturing process. Thus, the motor M and a part of the deceleration mechanisms are mounted in the accommodation chambers 11 and 12 of the case 6 in the present first process.

Subsequently, the elastic member 8, which is in the rectangular parallelepiped shape, is mounted to the accommodation groove 72 of the biasing portion 33 of the cover 7. Alternatively, the elastic member 8 is mounted to the contact portions 45 and 46 of the motor yoke 42 of the motor M. Subsequently, the cover 7 is mounted to the case 6, such that the elastic member 8 is interposed between the contact portions 45 and 46 of the motor yoke 42 of the motor M and the groove bottom surface of the accommodation groove 72 of the biasing portion 33 of the cover 7. When the cover 7 is mounted to the case 6, the motor M is temporary affixed. In the present state, the fitting projected portions 37 of the tip ends of the lock arms 36 of the cover 7 and the fitting projected portions 23 of the case 6 are snap-fitted together.

When the fitting projected portions 23 are snap-fitted to the fitting projected portions 37, the elastic member 8, which is interposed between the motor M and the cover 7, is compressed in the direction in which the fitting projected portions 23 are fitted to the fitting projected portions 37. Therefore, the elastic member 8 causes resiliency (elasticity) in the direction in which the fitting projected portions 23 and multiple fitting projected portions 37 are fitted together. The rear surface of the cover 7 on the lower side in the drawing has the biasing portion 33. When the cover 7 is mounted to the case 6 to close the opening 14 of the case 6, the biasing portion 33 makes contact with the contact portions 45 and 46 of the motor yoke 42 of the motor M via the elastic member 8. Thus, the biasing portion 33 biases the motor M toward the holder portion 21 of the case 6. In this way, the motor gear assembly is interposed between the holder portion 21 of the case 6 and the biasing portion 33 of the cover 7 via the elastic member 8. In the present state, the motor gear assembly is accommodated in the accommodation chambers 11 and 12. Therefore, the motor gear assembly is positioned and held relative to the radial direction of the motor shaft 41.

The bottom surface (inner surface) of the bottom portion 62 of the case 6 defines the first fitting recessed portion, to which the one end of the gear shaft 55 in the axial direction is press-fitted. The roof surface (inner surface) of the cover plate 31 of the cover 7 defines the second fitting recessed portion, to which the other end of the gear shaft 55 in the axial direction is fitted. Therefore, the gear shaft assembly is accommodated in the accommodation chamber 12 while being interposed between the bottom surface of the first fitting recessed portion of the bottom portion 62 of the case 6 or a vicinity thereof and the bottom surface of the second fitting recessed portion of the cover plate 31 of the cover 7 or a vicinity thereof. Therefore, the gear shaft assembly is positioned in the radial direction of the motor shaft 41. In this way, the motor M is temporarily affixed between the holder portion 21 of the case 6 and the biasing portion 33 of the cover 7 via the elastic member 8 in a second process. In the present state, the cover 7 is snap-fitted to the case 6. Therefore, the cover 7, the elastic member 8, and the motor M are restricted from being detached from the case 6.

Subsequently, the gasket 9 is mounted to the mounting groove 64 of the opening periphery 16 of the case 6, such that the bottom surface of the gasket 9 is in contact with the groove bottom surface of the mounting groove 64 of the opening periphery 16 of the case 6 in a third process. The present state is before the electric actuator is mounted to the support portion 2 of the intake manifold 1. In the present state, the gasket 9 is mounted to the mounting groove 64, such that a part of the gasket 9 is projected (protruded) upward in the drawing to the outside beyond the mounting surface of the opening periphery 16 of the case 6. Before or after the first to third processes, the valves, the valve shaft 5, the output gear 54, the coupling 56, and the rubber cushion 57 are assembled together beforehand to be in a form of the sub-assembly (valve assembly), and the valve assembly is mounted to the intake manifold 1.

Subsequently, a manufacturing process of the intake manifold 1 to the support portion 2 will be briefly described with reference to FIGS. 2 to 9B. First, the mounting surface of the mounting boss 24 of the case 6 is caused to be in contact with the mounting surface of the support portion 2 of the intake manifold 1. In the present state, the through holes of the mounting boss 24 of the case 6 are overlapped with the female screw holes of the support portion 2 of the intake manifold 1. Subsequently, the shaft portion of the screw 3 is inserted into each of the through holes of the mounting boss 24 of the case 6. Subsequently, a mounting tool is fitted to a tool fitting portion (head portion) of each of the screws 3. Subsequently, the mounting tool is rotated in a predetermined direction, thereby to mount the screw 3 into the female screw hole. In this way, the male screw formed on the outer circumferential periphery of the shaft portion of the screw 3 is meshed with the female screw formed in the inner circumferential periphery of the female screw hole in a spiral shape. Thus, the mounting boss 24 of the case 6 is screwed and affixed to the support portion 2 of the intake manifold 1. In the present state, the elastic member 8 is compressed in the direction in which the case 6 is screwed to the support portion 2 of the intake manifold 1. Therefore, the motor M is elastically supported between the holder portion 21 of the case 6 and the biasing portion 33 of the cover 7 via the elastic member 8.

In addition, the elastic member 8 is squashed in the direction in which the case 6 is screwed to the support portion 2 of the intake manifold 1. Therefore, the elastic member 8 causes resiliency in a direction in which the fitting projected portions 23 are detached from the fitting projected portions 37. In the present state, fitting between the fitting projected portions 23 and the fitting projected portions 37 are released to form a clearance S between the first fitting surface (opposed surface) of the fitting projected portion 23 and the second fitting surface (opposed surface) of the fitting projected portion 37. The cover 7 and the elastic member 8 are interposed between the support portion 2 of the intake manifold 1 and the case 6 via the motor M. Therefore, the cover 7, the elastic member 8, and the motor M are restricted from being detached from the support portion 2 of the intake manifold 1. In this way, the motor M is permanently affixed, and electric actuator is mounted to the support portion 2 of the intake manifold 1 in a fourth process.

Effect of First Embodiment

As described above, the tumble control valve according to the present embodiment includes the electric actuator. Specifically, the motor M, the worm gear 51, the helical gear 52, the spur gear 53, and the gear shaft 55 are mounted in the accommodation chambers 11 and 12 of the case 6. The cover 7 and the elastic member 8 are mounted to cover the opening 14 of the case 6. The gasket 9 is mounted to the mounting groove 64 of the opening periphery 16 of the case 6. After all, the electric actuator is mounted to the support portion 2 of the intake manifold 1.

In the electric actuator, the motor M, the worm gear 51, the helical gear 52, the spur gear 53, and the gear shaft 55 are first mounted in the accommodation chambers 11 and 12 of the case 6. Thereafter, the motor M is temporary affixed with the biasing portion 33 of the cover 7 to interpose the elastic member 8 between the contact portions 45 and 46 of the motor yoke 42 of the motor M and the groove bottom surface of the accommodation groove 72 of the biasing portion 33 of the cover 7. In the present state, the biasing portion 33 of the cover 7 makes contact with the contact portions 45 and 46 of the motor yoke 42 of the motor M via the elastic member 8. Thus, the biasing portion 33 biases the motor M toward the holder portion 21 of the case 6.

Thereafter, the mounting boss 24 of the case 6 is screwed and affixed to the support portion 2 of the intake manifold 1 by using the screws 3. In this way, the gasket 9, which is mounted to the mounting groove 64 of the opening periphery 16 of the case 6, is tightly in contact with the mounting surface of the support portion 2 of the intake manifold 1. Thus, the gasket 9 seals the small clearance between the mounting surface of the support portion 2 of the intake manifold 1 and the opposed end surface of the cover plate 31 of the cover 7. In the present state, the elastic member 8 is compressed in the direction in which the case 6 is screwed to the support portion 2 of the intake manifold 1. Therefore, the motor M is elastically supported between the holder portion 21 of the case 6 and the biasing portions 33 of the cover 7 via the elastic member 8. In this way, permanent affixation of the motor M and the assembly of the motor M to the support portion 2 of the intake manifold 1 are completed.

It is noted that, the mounting direction of the motor M to the accommodation chamber 11 of the case 6 and the mounting direction of the gear shaft 55 to the accommodation chamber 12 of the case 6 are substantially the same as the screwing direction of the mounting boss 24 of the case 6 to the support portion 2 of the intake manifold 1. That is, the mounting operation of the motor M and the deceleration mechanism to the accommodation chambers 11 and 12 of the case 6 is implemented in the common one direction from the mounting surface side of the case 6. In this way, the present configuration renders the mounting direction of the motor gear assembly the same as the mounting direction of the gear shaft assembly. Thus, the present configuration facilitates the mounting operation of the functional component of the electric actuator relative to the accommodation chambers 11 and 12 of the case 6.

It is noted that, Patent Documents 1 and 2 disclose actuators. The configurations of Patent Documents 1 and 2 require three sealing processes. Specifically, the sealing processes include sealing of a motor gear assembly by using a gasket and thermal crimping. The sealing processes further include sealing of a gear shaft assembly by employing ultrasonic welding. The sealing processes further include airtight sealing of a joint portion (affixed portion) of a housing to a support portion of an intake manifold by using a gasket and two bolts. Consequently, the configurations of Patent Documents 1 and 2 may incur increase in number in components and in manufacturing cost. In addition, the configurations of Patent Documents 1 and 2 employ sealing of the motor gear assembly by using the gasket and thermal crimping, and therefore, the sealing method is limited, and a material of the case may be limited to a metallic material.

In consideration of this, the electric actuator according to the present disclosure has the above-described configuration. Specifically, the gasket 9 on the side of the mounting surface of the case 6 is selectively (only) employed to seal the case 6 relative to the support portion 2 of the intake manifold 1 and to seal the cover 7 relative to the case 6. In this way, the number of sealing portion is reduced to one. That is, the sealing portion may be converged into one location. Thus, the present configuration enables to reduce the number of components and the manufacturing cost. Specifically, in the present configuration, the gasket 9 is mounted to the mounting groove 64 of the opening periphery 16 of the case 6. The gasket 9 is tightly in contact with the mounting surface of the support portion 2 of the intake manifold 1. Thus, the gasket 9 airtightly seal the small clearance between the mounting surface of the support portion 2 of the intake manifold 1 and the opposed end surface of the cover plate 31 of the cover 7. The present configuration enables to reduce the sealing portion into one location, compared with the conventional configuration, which requires the sealing portions at the three locations. In this way, the present configuration enables to reduce the number of components and to reduce the sealing processes such as thermal crimping and ultrasonic welding, thereby to reduce manufacturing cost. In addition, the present configuration employs the gasket 9 as a sealing member of the motor gear assembly. Therefore, the material of the case 6 may be optional from a metallic material or a synthetic resin. Furthermore, the present configuration has both the function temporarily to affix the motor in transportation of the electric actuator and the function permanently to affix the motor in the assembly of the electric actuator to the support portion 2 of the intake manifold 1.

In addition, before the electric actuator is mounted to the support portion 2 of the intake manifold 1, the projection height H1 of the gasket 9, the projection height H2 of the cover 7, and the projection height H3 of the opening periphery 16 of the case 6 satisfy the relation of H1>H2>H3. Therefore, when the electric actuator is mounted to the support portion 2 of the intake manifold 1, the support portion 2 of the intake manifold 1 first holds the gasket 9, and subsequently, presses the cover 7 to affix the motor. Therefore, the present configuration enables to enhance reliability of the airtight sealing of the clearance between the support portion 2 of the intake manifold 1 and the opening periphery 16 of the case 6.

In addition, the elastic member 8 is equipped to be in surface contact with the contact portions 45 and 46 of the motor yoke 42 of the motor M along the rotational axis direction (thrust direction, longitudinal direction) of the motor M. That is, the elastic member 8 is equipped in parallel with the longitudinal direction (thrust direction) of the motor M, thereby to enable certainty (efficiency) of affixation of the motor. In addition, the sealing portion is equipped to the tip end surface (top surface) of the annular elongated projected rib 73. The annular elongated projected rib 73 is in a cornered annular shape and is projected from the opposed end surface of the cover plate 31 of the cover 7 toward the mounting surface of the support portion 2 of the intake manifold 1. The annular elongated projected rib 73 is tightly in contact with the mounting surface of the support portion 2 of the intake manifold 1. Thus, the annular elongated projected rib 73 seals the small clearance between the mounting surface of the support portion 2 of the intake manifold 1 and the opposed end surface of the cover plate 31 of the cover 7. The present configuration enables the annular elongated projected rib 73 of the cover 7 to be tightly in contact with the support portion 2 of the intake manifold 1, thereby to enhance certainty (efficiency) of affixation of the motor.

Modification

According to the above-described embodiment, the actuator of the present disclosure is employed in the electric actuator, which is equipped with the motor M and the deceleration mechanism to generate a power to drive the movable object (rotational object), such as the valve to open and close the passage. It is noted that, the actuator of the present disclosure may be employed in an electric actuator, which is equipped with a motor M and a deceleration mechanism to generate a power to drive a linearly movable object, such as a poppet valve to open and close a passage.

It may be conceivable to employ, as the valve (movable object), a rotary valve, a butterfly valve, a shutter valve, a ball valve, and/or the like.

It may be conceivable to employ, as the movable object, a rotational object (rotor), such as a compressor, a fan, a pump cam, a rotor, a wheel, and/or the like. It may be conceivable to employ, as the movable object, a linearly movable object, such as a piston, a rod, a shaft, and/or the like.

According to the above-described embodiment, the actuator of the present disclosure is employed in an electric actuator, which is equipped with the motor M and the deceleration mechanism to generate a power to drive the tumble valve, which is the valve element of the tumble control valve to open and close the engine intake passage. It is noted that, the actuator of the present disclosure may be employed in an electric actuator, which is equipped with a motor M and a deceleration mechanism to generate a power to drive a valve, which is a valve element of an intake air control valve to open and close an engine intake passage. The intake air control valve may be, for example, a swirl valve, a throttle valve, and/or the like.

It may be conceivable to employ, as the intake-air-control valve, a variable intake air control valve, a swirl control valve, an intake air quantity control valve, an intake air pressure control valve, a passage selector valve, an intake throttle valve, and/or the like.

According to the above-described embodiment, the actuator of the present disclosure is employed in an electric actuator, which is equipped with the motor M and the deceleration mechanism to generate a power to drive the tumble valve, which is the valve element of the tumble control valve to open and close the engine intake passage. It is noted that, the actuator of the present disclosure may be employed in an electric actuator, which is equipped with a motor M and a deceleration mechanism to generate a power to drive a valve, which is a valve element of an exhaust control valve to open and close an engine exhaust passage and/or an exhaust gas recirculation passage.

It is conceivable to employ, as the exhaust control valve, a waste gate valve, a scroll selector valve, an exhaust flow control valve, an exhaust pressure control valve, a passage selector valve, an exhaust throttle valve, and/or the like.

According to the above-described embodiment, as the support axis of the deceleration mechanism, the gear shaft 55 is employed rotatably to support the helical gear 52 and the spur gear 53. It is noted that, as the support axis of the deceleration mechanism, a gear shaft 55 may be employed rotatably to support the helical gear 52 and the spur gear 53 and to include an impact-absorbing member, which is formed of an elastomer material, between the helical gear 52 and the spur gear 53.

The deceleration mechanism may include a pinion gear, an intermediate gear, and an output gear, and/or the like. The pinion gear is connected with the motor shaft (output shaft) 41 of the motor M and is integrally rotatable with the motor shaft 41. The intermediate gear is geared with the pinion gear is and rotated by the pinion gear. The output gear is geared with the intermediate gear and is rotated by the intermediate gear. The deceleration mechanism may be configured to implement two-step speed reduction on the output power of the motor shaft 41 of the motor M and to transmit the reduced output power to the valve shaft 5, a valve, or a movable object.

The configuration according to the present disclosure enables to mount the motor and components of the deceleration mechanism to the accommodation chamber of the case in the same one direction from the mounting surface side of the case. The components of the deceleration mechanism include at least the gear shaft, the worm gear, the helical gear, the spur gear. The gear shaft functions as a support axis of the deceleration mechanism. The present configuration enables the mounting direction of the motor to be the same as the mounting direction of the support axis of the deceleration mechanism. Thus, the present configuration enables to enhance mountability. According to the above-described configuration, the mounting direction of the motor to the accommodation chamber of the case is substantially the same as the mounting direction of the support axis of the deceleration mechanism to the accommodation chamber of the case and the screwing direction of the housing to the support portion of the affixing member.

The above-described configuration enables the mounting operation of the motor and the deceleration mechanism to the accommodation chamber of the case in the one direction from the mounting surface side of the case. Therefore, the configuration enables the mounting direction of the motor to be the same as the mounting direction of the support axis of the deceleration mechanism. Thus, the configuration enables to enhance mountability. According to the above-described configuration, only the gasket enables sealing of the housing to the support portion of the affixing member and sealing of the cover to the case, thereby to enable to reduce number of the components and to reduce manufacturing cost.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:
1. An actuator comprising:
a motor configured to generate an output power;
a deceleration mechanism configured to decelerate rotation of the motor; and a housing accommodating the motor and the deceleration mechanism, wherein the housing is configured to be screwed to and affixed to a support portion of an affixing member, the deceleration mechanism includes a support axis extending in a direction, which is perpendicular to an axial direction of an output shaft of the motor, the housing includes a case and a cover, the case is in a bottomed tubular shape and has an opening, an accommodation chamber, and a holder portion, the opening opens in a radial direction of the motor and in an axial direction of the support axis, the opening being configured to open on a side of the support portion, the accommodation chamber extends from the opening toward a bottom, the holder portion surrounds the bottom of the accommodation chamber and is in contact with the motor, the cover is mounted to the case to surround the opening, the cover has a biasing portion, which forms a hollow portion with the holder portion, the hollow portion accommodates at least the motor, the motor and the deceleration mechanism are mountable to the accommodation chamber in one direction from a side of a mounting surface of the case, the housing has the mounting surface, which is configured to be mounted to the support portion, the actuator further comprising:

an elastic sealing member formed of an elastic material and mounted to the mounting surface, wherein the elastic sealing member is configured to be tightly in contact with the support portion to seal a clearance between the mounting surface of the housing and the support portion, the elastic sealing member has a projection height H1, before the housing is mounted to the support portion, the cover has a projection height H2, before the housing is mounted to the support portion, and the case has a projection height H3, before the housing is mounted to the support portion, wherein the projection height H1, the projection height H2, and the projection height H3 satisfy the following relation: H1>H2>H3.

2. The actuator according to claim 1, wherein a mounting direction, in which the motor is mounted to the accommodation chamber is substantially the same as a mounting direction, in which the support axis is mounted to the accommodation chamber and a screwing direction, in which the housing is screwed to the support portion.

3. The actuator according to claim 1, wherein
the deceleration mechanism includes a first gear and a second gear,
the first gear is connected with the output shaft of the motor and rotatable integrally with the output shaft,
the second gear is rotatably fitted to an outer periphery of the support axis, and
the second gear is meshed with the first gear and is rotatable.

4. The actuator according to claim 1, wherein
the cover has an opposed end surface and a projected portion,
the opposed end surface is configured to be opposed to the support portion to form a clearance with the support portion,
the projected portion is projected from the opposed end surface and is configured to be projected toward the support portion, and
the projected portion is configured to be tightly in contact with the support portion to seal the clearance between the support portion and the opposed end surface.

5. The actuator according to claim 1, further comprising:
an elastic member formed of an elastic material and located with the motor in the hollow portion, wherein
the elastic member is interposed between the biasing portion and the motor to elastically support the motor with the holder portion.

6. The actuator according to claim 5, wherein the biasing portion is configured to be in contact with the motor via the elastic member to bias the motor toward the holder portion when the cover is mounted to the case to surround the opening.

7. The actuator according to claim 1, wherein
the housing has the mounting surface configured to be mounted to the support portion,
the actuator further comprising:
a sealing member formed of an elastic material and mounted to the mounting surface of the housing, the sealing member configured to be tightly in contact with the support portion to seal a clearance between the support portion and the mounting surface of the housing; and
an elastic member formed of an elastic material and located with the motor in the hollow portion, the elastic member being interposed between the biasing portion and the motor to elastically support the motor with the holder portion.

8. The actuator according to claim 7, wherein
the case includes a first fitting portion,
the cover includes a cover portion, an arm portion, a second fitting portion,
the cover portion surrounds the opening,
the arm portion extends from the cover portion toward the bottom of the accommodation chamber, and
the second fitting portion is equipped to the arm portion and is configured to be fitted to the first fitting portion when the cover is mounted to the case.

9. The actuator according to claim 8, wherein the elastic member is configured to generate elasticity, in a direction in which the second fitting portion is fitted to the first fitting portion, to bias the cover relative to the motor, when the cover is mounted to the case to surround the opening and when the motor is temporary affixed.

10. The actuator according to claim 7, wherein the elastic member is pressed between the motor and the biasing portion to generate elasticity in a direction to release fitting between the first fitting portion and the second fitting portion, when the housing is screwed to the support portion and when the motor is permanently affixed.

11. An actuator comprising:
a motor configured to generate an output power;
a deceleration mechanism configured to decelerate rotation of the motor; and
a housing accommodating the motor and the deceleration mechanism, wherein
the housing is configured to be screwed to and affixed to a support portion of an affixing member,
the deceleration mechanism includes a support axis extending in a direction, which is perpendicular to an axial direction of an output shaft of the motor,
the housing includes a case and a cover, the case is in a bottomed tubular shape and has an opening, an accommodation chamber, and a holder portion, the opening opens in a radial direction of the motor and in an axial direction of the support axis, the opening being configured to open on a side of the support portion, the accommodation chamber extends from the opening toward a bottom, the holder portion surrounds the bottom of the accommodation chamber and is in contact with the motor, the cover is mounted to the case to surround the opening, the cover has a biasing portion, which forms a hollow portion with the holder portion, the hollow portion accommodates at least the motor, the motor and the deceleration mechanism are mountable to the accommodation chamber in one direction from a side of a mounting surface of the case, the cover has an opposed end surface and a projected portion, the opposed end surface is configured to be opposed to the support portion to form a clearance with the support portion, the projected portion is projected from the opposed end surface and is configured to be projected toward the support portion, and the projected portion is configured to be tightly in contact with the support portion to seal the clearance between the support portion and the opposed end surface.

* * * * *